June 2, 1936.  C. J. DUNZWEILER ET AL  2,042,515
STORAGE BATTERY
Filed Aug. 10, 1933    2 Sheets-Sheet 2

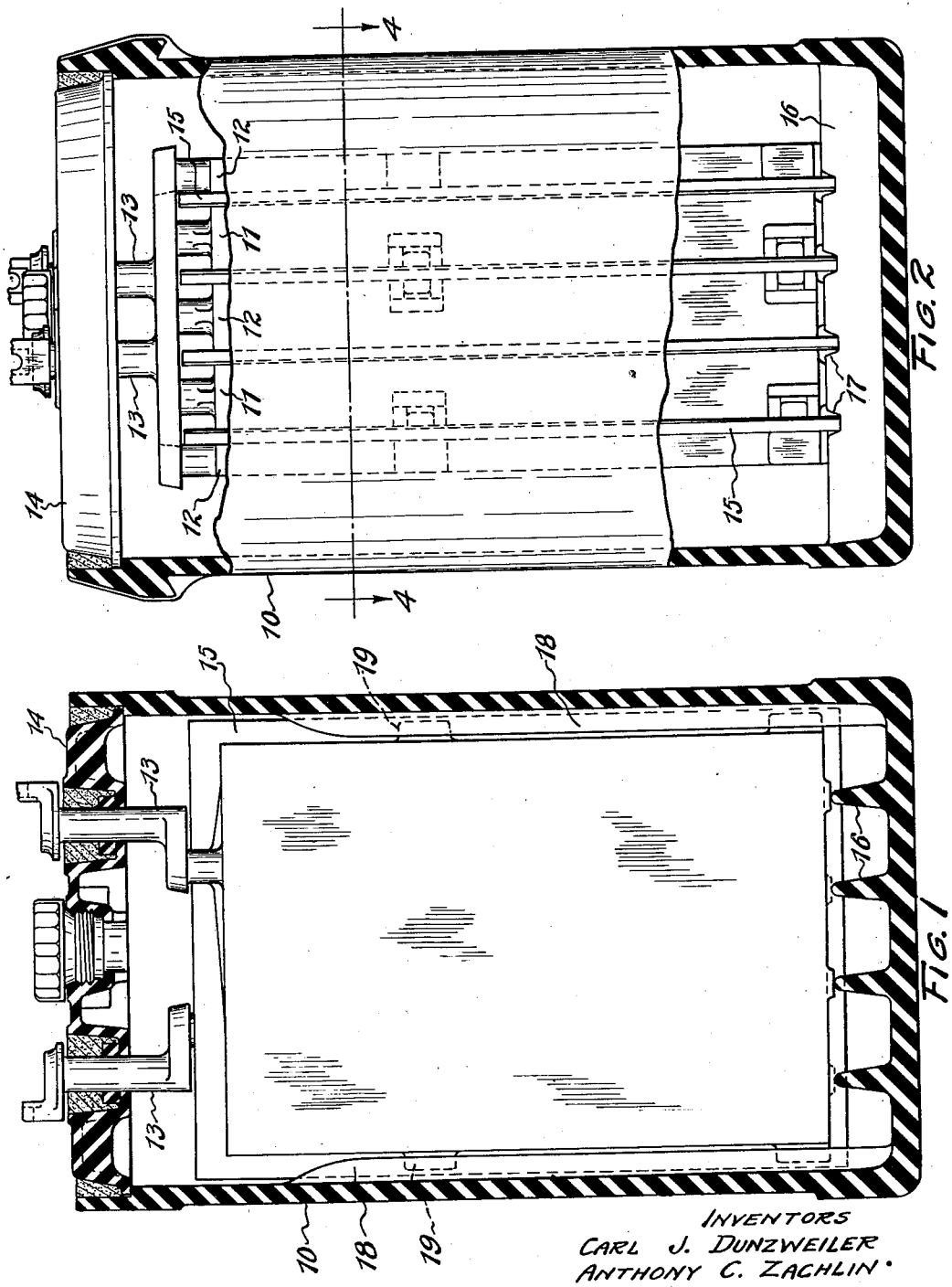

INVENTORS
CARL J. DUNZWEILER
ANTHONY C. ZACHLIN

Kwis Hudson & Kent
ATTORNEYS

Patented June 2, 1936

2,042,515

UNITED STATES PATENT OFFICE 2,042,515

STORAGE BATTERY

Carl J. Dunzweiler, Cleveland, and Anthony C. Zachlin, South Euclid, Ohio, assignors to Willard Storage Battery Company, Cleveland, Ohio, a corporation of West Virginia Application August 10, 1933, Serial No. 684,512

8 Claims. (Cl. 136—81)

This invention relates to storage batteries, and has particular reference to certain improvements in the manner of supporting the plates and the separators by means of certain cooperating supporting parts of the container.

The invention has particular utility in a battery composed of unusually thick and heavy plates and a relatively small number of plates for performance conditions quite different from those obtainable from batteries heretofore used, the construction and arrangement being such that different and more effective supporting relationship between the container and the plates and separators is required.

The principal object of the present invention is to so interlock the separators and plates with reference to the supporting parts of the container that the plates, notwithstanding their thickness and weight, and the separators will be maintained in their proper and previously determined relationship in the container while at the same time a high degree of compactness and economy of materials are obtained by a novel and effective disposition of the overlapping or interlocking parts.

The invention may be briefly summarized as consisting in certain novel details of construction and combinations and arrangements of parts which will be described in the specification and set forth in the appended claims.

In the accompanying sheets of drawings,

Fig. 1 is a vertical sectional view through the battery, the section being taken parallel with the plates;

Fig. 2 is a partial side elevation and partial sectional view with the section at right angles to that of Fig. 1;

Figure 4:
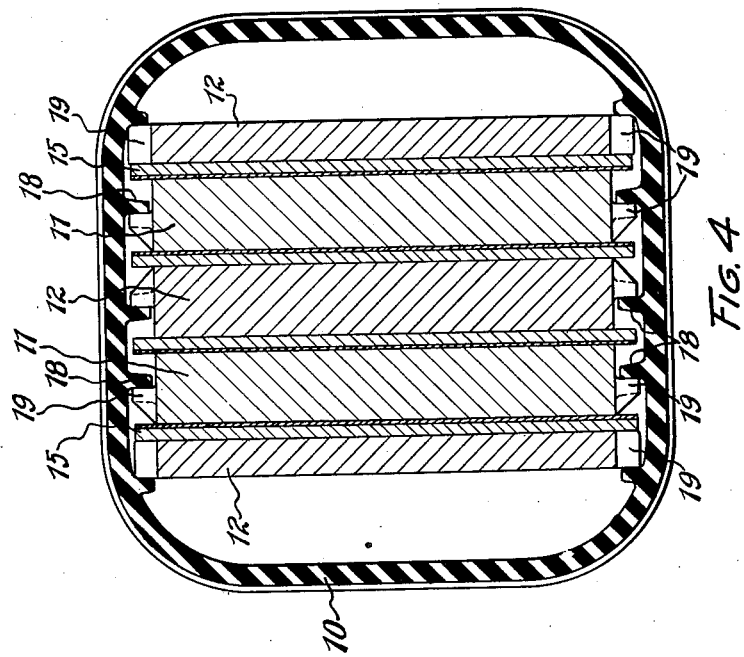
Fig. 4 is a transverse sectional view substantially along the line 4—4 of Fig. 2.

Referring now to the drawings, 10 represents the container which may be molded from hard rubber or other suitable material. In this instance the battery illustrated is composed of a single cell, but, if necessary, it may be composed of a plurality of cells. It will be noted that the battery has a small number of plates, but the plates are unusually thick and therefore heavy, five plates being here shown consisting of two positive plates 11 and three negative plates 12, the two outer negative plates being of about one-half the thickness of the other three plates. The plates of the two groups are united to the usual straps connected to the terminal post 13 which may be sealed in the cover 14 in any approved manner.

Between adjacent plates are arranged insulators or separators 15 which preferably project outwardly beyond the sides, top and bottom of the plates. These separators may be constructed in different ways but are preferably double separators constructed and arranged so as to be in good supporting relation with the active material of both plates as, for example, a ribbed thread-rubber separator or a wooden separator placed against the active material of the negative plate and a perforated rubber sheet in supporting relation with the active material of the adjacent positive plate. However, the character and form of the insulators are not material to the present invention.

Figure 3:
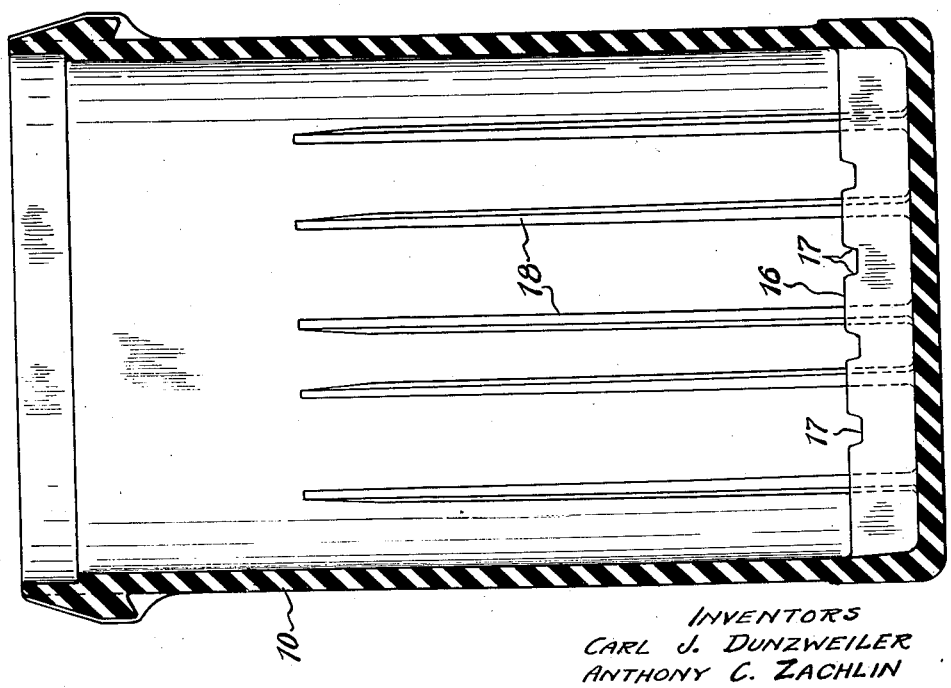
Fig. 3 is a vertical sectional view through the container, the section being taken with the container in the position shown in Fig. 2.

It will be noted that at the bottom of the container are bottom rests in the form of ribs 16 extending upwardly from the bottom of the container. The plates have lugs or feet which rest upon the tops of the ribs 16, and the latter are notched as shown at 17, the notches occurring between the plates, as shown in Fig. 2, and receiving the lower portions of the separators. In this manner the separators are positioned, and at the same time they extend down below the plates to an extent equal to the depth of the notches. On the two upright walls of the container 10 which are opposite the edges of the plates, and located in offset relation with respect to the notches 17 of the bottom rests or ribs 16 are plate-supporting ribs 18, the location of these ribs 18 with respect to the notches 17 being illustrated in Fig. 3. The upper ends of these ribs are preferably tapered, as illustrated in Fig. 1, so as to assist in guiding the battery element into the container during assembly.

While it has been customary heretofore to provide plate-supporting ribs on the upright walls of the container and to extend the plates outwardly between these ribs, in this instance the ribs are in supporting relation with the plates in quite a different and novel manner. Instead of extending the plates outwardly between the ribs, both lead and active material are conserved by providing lugs 19 on the edges of the plates, i. e., on the upright sides of the grids used in forming the plates, which lugs 19 overlap and are adapted to bear against the ribs 18. Preferably two such lugs are provided on each side of each plate, one at the bottom and the other near but some distance down from the top. In the case of the three wider plates, the lugs 19 are considerably narrower than the width of the plates, but on the two outer and thinner plates 12, the width of the lugs may correspond with the thickness of these plates as illustrated.

The grids used in forming the plates of this battery are preferably similar to those constituting the subject matter of application Serial No. 684,510, in the name of Carl J. Dunzweiler, filed of even date herewith.

Another feature to be noted especially by reference to Fig. 4 is that one side only of each rib and one side only of each rib engaging lug 19 are utilized for supporting purposes, the arrangement being such with reference to each pair of plates and the intervening separator that lateral movement in one direction is prevented by the engagement of the lugs on one of the plates with two oppositely disposed ribs 18 of the container, and relative movement in the opposite direction is prevented by the engagement of the lugs of the other plate with two other oppositely disposed ribs 18.

This is an advantage in manufacture since, instead of providing two ribs on one side of the container and two ribs on the opposite side to position each plate, there need be provided on each ribbed side of the container only as many ribs as there are plates, and, further, the manufacture of both the grids and the container is facilitated through the necessity of having a true and flat bearing surface on one face only of each lug and on one side only of each rib. This feature is made possible only by irregularly spacing the container ribs as will be seen by reference to Figs. 3 and 4.

Additionally, the wide spacing of the ribs permitted by the arrangement explained above allows ample space for the separators to project outwardly beyond the plates in the spaces between the ribs.

With the arrangement above described, the plates and separators are well supported and maintained in their desired relative positions, and the other objects mentioned at the beginning of the specification are accomplished in a very effective manner.

In the claims, in defining the plates, the word "side" or "sides" refers to the extensive surfaces which are next to or parallel with the separators. The remaining surfaces of the plates are referred to as the "edges" of the plates. Likewise, in the claims the "sides" of the ribs 18 are the surfaces thereof which are parallel or substantially parallel with the sides of the plates, and the "inner sides" of two adjoining ribs 18 are the two sides or surfaces which face each other.

While we have shown the preferred construction, we do not desire to be confined to the precise details or arrangements shown, but aim in our claims to cover all modifications which do not involve a departure from the spirit and scope of the invention.

Having thus described our invention, we claim:

1. In a storage battery, a container, and a battery element therein composed of positive and negative plates, opposite walls of the container having upright plate-supporting ribs and the edges of the plates having projecting lugs the sides of which are adapted to engage the sides of the ribs to prevent lateral movement of the plates the lugs being of less thickness than the plates and having rib-engaging faces located inwardly of the planes of the sides of the plates.

2. In a storage battery, a container, a battery element therein composed of positive and negative plates and a separator between each pair of adjacent plates, and plate-supporting ribs on two opposite walls of the container, two adjoining plates having edge portions projecting between and engaging two adjacent ribs on a wall of the container.

3. In a storage battery, a container, a battery element therein composed of positive and negative plates and a separator between adjacent plates, plate-supporting ribs on two opposite walls of the container, and lugs projecting laterally from the edges of the plates, pairs of adjacent ribs on a wall of the container receiving between them and engaging lugs of two adjacent plates.

4. In a storage battery, a container, a battery element therein composed of positive and negative plates and a separator between adjacent plates, plate-supporting ribs on two opposite walls of the container, and lugs projecting laterally from the edges of the plates, pairs of adjacent ribs receiving between them and engaging lugs of two adjacent plates, the separators projecting laterally beyond the plates between the ribs.

5. In a storage battery, a container and a battery element therein composed of positive and negative plates, opposite walls of the container having upright plate-supporting ribs, and the edges of the plates having projecting lugs the sides of which engage the sides of the ribs to prevent lateral movement of the plates, lugs on one pair of adjacent plates engaging the inner sides of a pair of adjoining ribs.

6. In a storage battery, a container and a battery element therein composed of positive and negative plates, opposite walls of the container having upright plate-supporting ribs, and the edges of the plates having projecting lugs the sides of which engage the sides of the ribs to prevent lateral movement of the plates, the lugs on part of the plates engaging on one side only of ribs and the lugs on other plates engaging the opposite side only of other ribs.

7. In a storage battery, a container and a battery element therein composed of positive and negative plates, two opposite walls of the container having upright plate-supporting ribs and the edges of the plates having projecting lugs the sides of which are adapted to engage the sides of the ribs, the lugs on each of certain of the plates having rib-engaging faces in a plane located inwardly of the planes of the sides of such plate.

8. In a storage battery, a container and a battery element therein composed of positive and negative plates, two opposite walls of the container having upright plate-supporting ribs and the edges of the plates having projecting lugs the sides of which are adapted to engage the sides of the ribs, the lugs on each of certain of the plates having rib-engaging faces located in a plane coinciding substantially with the central plane of the plate.

CARL J. DUNZWEILER.
ANTHONY C. ZACHLIN.